United States Patent
Gagliano et al.

(10) Patent No.: US 10,900,583 B2
(45) Date of Patent: Jan. 26, 2021

(54) EXPLOSION PROOF ACTUATOR ASSEMBLY AND SERVO SYSTEM

(71) Applicant: Motion Express, Inc., Castle Rock, CO (US)

(72) Inventors: Darl Gagliano, Parker, CO (US); Mike Heinlein, Castle Rock, CO (US); William J Heinlein, Castle Rock, CO (US)

(*) Notice: Subject to any disclaimer, the term of this patent is extended or adjusted under 35 U.S.C. 154(b) by 189 days.

(21) Appl. No.: 16/037,413

(22) Filed: Jul. 17, 2018

(65) Prior Publication Data

US 2019/0017619 A1 Jan. 17, 2019

Related U.S. Application Data

(60) Provisional application No. 62/533,411, filed on Jul. 17, 2017.

(51) Int. Cl.

| | |
|---|---|
| *F16K 27/02* | (2006.01) |
| *F16K 31/04* | (2006.01) |
| *F16K 31/50* | (2006.01) |
| *F16K 37/00* | (2006.01) |
| *F16K 27/00* | (2006.01) |

(Continued)

(52) U.S. Cl.
CPC ............ *F16K 27/029* (2013.01); *F16K 27/00* (2013.01); *F16K 31/04* (2013.01); *F16K 31/508* (2013.01); *F16K 37/005* (2013.01); *F16K 37/0033* (2013.01); *H02K 5/136* (2013.01); *F16H 2025/204* (2013.01); *F16H 2025/2078* (2013.01)

(58) Field of Classification Search
CPC ............... F16K 37/005; F16K 37/0041; F16K 37/0033; F16K 37/0025; F16K 27/00; F16K 27/02; F16K 27/029; F16K 27/044; F16K 27/048; F16K 31/508; F16K 31/50; F16K 31/04; F16K 31/043; F16H 2025/2078; F16H 2025/204; H02K 5/136; H02K 5/132
USPC ................. 251/129.11, 229; 310/40 R, 261.1
See application file for complete search history.

(56) References Cited

U.S. PATENT DOCUMENTS

| | | | | |
|---|---|---|---|---|
| 2,817,026 | A * | 12/1957 | Robinson ................. | H02K 9/24 310/88 |
| 3,276,288 | A * | 10/1966 | Fry ......................... | F16K 31/04 74/606 R |

(Continued)

FOREIGN PATENT DOCUMENTS

| | | |
|---|---|---|
| CA | 2896529 | 7/2014 |
| CN | 28965292799994 | 7/2006 |

(Continued)

OTHER PUBLICATIONS

"How to Select Motors for Hazardous Locations" by Edward Cowern, publicly available since Nov. 1, 2000 (referred as "Cowern") (Year: 2000).*

(Continued)

*Primary Examiner* — David Colon-Morales
(74) *Attorney, Agent, or Firm* — Leyendecker & Lemire, LLC

(57) ABSTRACT

An explosion proof actuator assembly and servo system is described. Embodiments of the present invention include an explosion proof actuator assembly and servo system that may implement a rotating nut and a threaded member to effectuate an opening and closing of a valve.

20 Claims, 11 Drawing Sheets

(51) Int. Cl.
*H02K 5/136* (2006.01)
*F16H 25/20* (2006.01)

(56) References Cited

U.S. PATENT DOCUMENTS

| | | | | |
|---|---|---|---|---|
| 4,460,009 A * | 7/1984 | Nanci | ............... | F16K 31/163 |
| | | | | 137/243.6 |
| 4,463,291 A * | 7/1984 | Usry | ............... | G05D 3/18 |
| | | | | 310/83 |
| 4,609,176 A * | 9/1986 | Powers | ............... | H02K 7/06 |
| | | | | 236/49.3 |
| 5,073,736 A * | 12/1991 | Gschwender | ............... | F04D 13/06 |
| | | | | 310/43 |
| 5,099,161 A * | 3/1992 | Wolfbauer, III | ............... | F16H 25/20 |
| | | | | 310/80 |
| 5,753,986 A * | 5/1998 | Ohtani | ............... | H02K 5/136 |
| | | | | 310/52 |
| 6,392,322 B1 * | 5/2002 | Mares | ............... | B23Q 5/58 |
| | | | | 310/12.04 |
| 6,460,567 B1 | 10/2002 | Hansen, III | | |
| 6,561,480 B1 * | 5/2003 | Komiya | ............... | F16K 1/50 |
| | | | | 251/129.12 |
| 6,981,428 B2 | 1/2006 | Donald | | |
| 7,871,059 B2 * | 1/2011 | Nalini | ............... | F16K 31/047 |
| | | | | 251/129.11 |
| 8,482,173 B2 * | 7/2013 | Wright | ............... | F04D 13/06 |
| | | | | 310/400 |
| 8,618,700 B2 * | 12/2013 | Muramatsu | ............... | F16H 25/20 |
| | | | | 310/12.01 |
| 8,851,451 B2 * | 10/2014 | Orino | ............... | C10B 25/10 |
| | | | | 251/267 |
| 8,857,464 B2 * | 10/2014 | Dolenti | ............... | F02D 11/106 |
| | | | | 137/554 |
| 8,899,315 B2 | 12/2014 | Nguyen | | |
| 8,931,755 B2 * | 1/2015 | Staffiere | ............... | F16K 31/055 |
| | | | | 251/129.11 |
| 9,003,903 B2 * | 4/2015 | Drumm | ............... | F16H 25/20 |
| | | | | 74/89.23 |
| 9,068,666 B2 * | 6/2015 | Roby | ............... | F01P 7/14 |
| 9,145,977 B2 | 9/2015 | Gamache | | |
| 9,831,739 B2 * | 11/2017 | Tejano | ............... | H02K 5/136 |
| 9,917,491 B2 * | 3/2018 | Northwall | ............... | H02K 5/136 |
| 9,927,043 B2 * | 3/2018 | Sakaguchi | ............... | F02M 23/006 |
| 10,090,730 B2 * | 10/2018 | Rudy | ............... | B23B 31/261 |
| 10,371,275 B2 * | 8/2019 | Lenz | ............... | F16H 25/2252 |
| 2006/0238039 A1 * | 10/2006 | Niedermeyer | ........ | F16K 31/047 |
| | | | | 310/49.01 |
| 2007/0159018 A1 * | 7/2007 | Martin | ............... | H02K 5/136 |
| | | | | 310/88 |
| 2011/0233441 A1 * | 9/2011 | Miners | ............... | F16K 3/0281 |
| | | | | 251/324 |
| 2013/0214188 A1 | 8/2013 | Young | | |
| 2014/0003914 A1 * | 1/2014 | Namous | ............... | F16D 7/08 |
| | | | | 415/123 |
| 2014/0054487 A1 * | 2/2014 | Namous | ............... | F16K 3/0254 |
| | | | | 251/326 |
| 2015/0135868 A1 * | 5/2015 | Nikolaev | ............... | F16F 3/02 |
| | | | | 74/89.34 |
| 2015/0377381 A1 | 12/2015 | King | | |
| 2017/0067455 A1 * | 3/2017 | Reukers | ............... | F04B 1/02 |
| 2018/0119840 A1 * | 5/2018 | Hishiya | ............... | F16K 25/00 |
| 2018/0248445 A1 * | 8/2018 | Chen | ............... | H02K 37/14 |
| 2018/0327054 A1 * | 11/2018 | Dixneuf | ............... | B63B 21/507 |
| 2018/0335113 A1 * | 11/2018 | Chung | ............... | F16H 25/20 |

FOREIGN PATENT DOCUMENTS

| | | |
|---|---|---|
| CN | 201827486 | 5/2011 |
| CN | 104901473 | 9/2015 |
| CN | 105190053 | 12/2015 |
| DE | 102013109570 | 3/2015 |
| EP | 2952326 | 12/2015 |
| JP | 2012047317 | 3/2012 |

OTHER PUBLICATIONS

"Choose the right electric motors for hazardous locations" by Uriah Van Amerom, publicly available since Nov. 2011 (referred as "Amerom"). (Year: 2011).*

* cited by examiner

EXPLOSION PROOF ACTUATOR ASSEMBLY AND SERVO SYSTEM

CROSS-REFERENCE TO RELATED APPLICATION

This application claims the benefit of U.S. Provisional Application No. 62/533,411, filed Jul. 17, 2017.

BACKGROUND

Methane emissions are usually vented via pneumatic actuators in the oil and gas industry leading to lost gas revenue and greater potential for fines by the Environmental Protection Agency. Any device that vents methane in an enclosed area should meet classification requirements for a Class 1 Division 1 explosion proof device. Meeting the classification requirements can significantly increase cost to the equipment. Further, currently available actuators that are Class 1 Division 1 rated need at least two or more flame paths in a front end cap of the actuator. Typically, the two paths are between (i) a housing and a front flange, (ii) a front flange and a rotor, or (iii) a front flange and a shaft. In common implementations, two critically dimensioned surfaces are required because the front flange is a critical component. Because typical actuators require two critical surfaces, the part is very expensive to manufacture in order to hold concentricity and cylindricity within tolerance, adding greatly to an overall cost of the device.

A zero emission, precision controlled actuator that meets the requirements for a Class 1 Division 1 rated device that can be produced at a lower cost than currently available actuators is needed.

DETAILED DESCRIPTION

Figure 1:
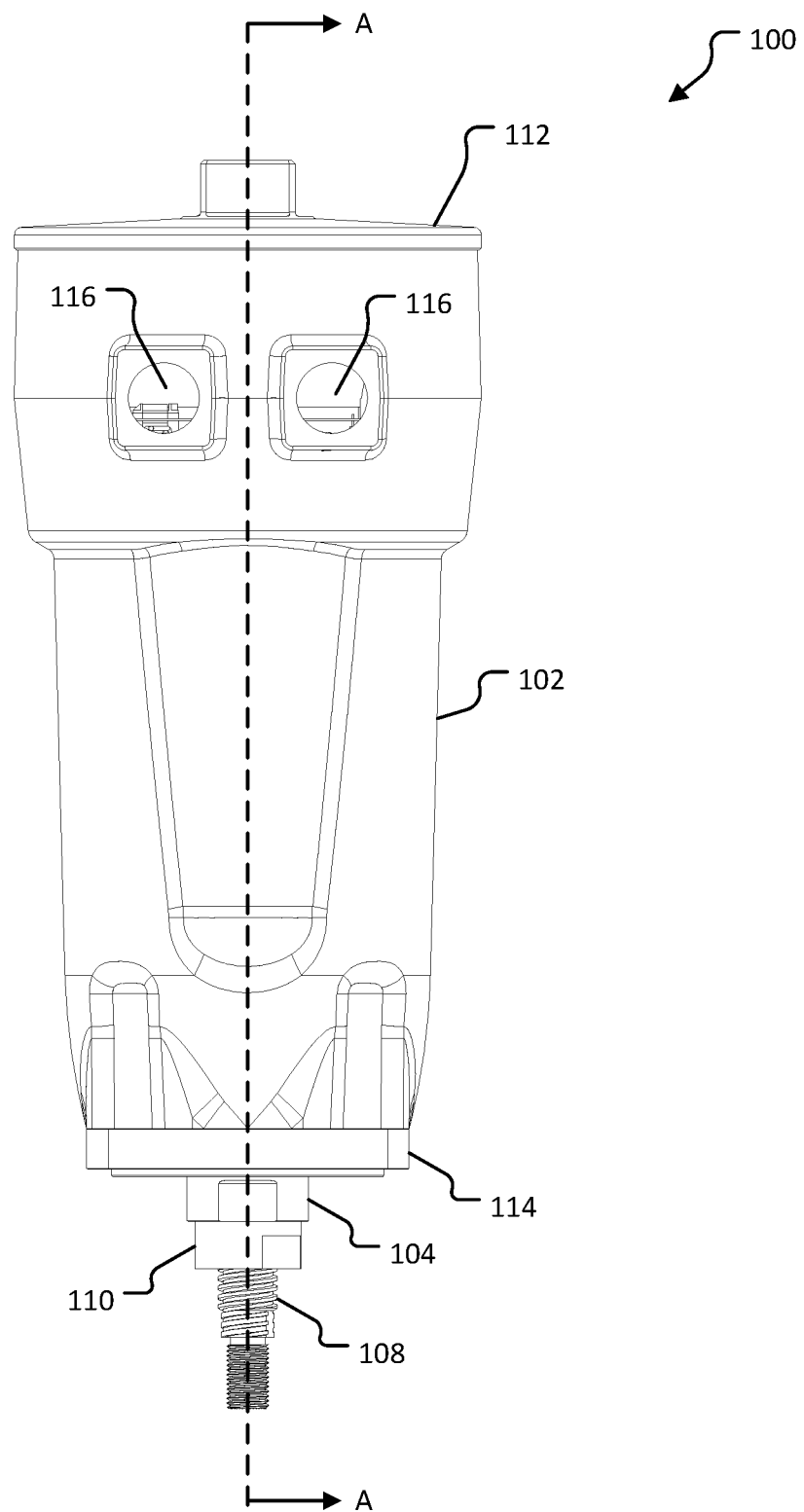
FIG. 1 is a front view of an explosion proof actuator assembly according to one embodiment of the present invention.

Embodiments of the present invention include an explosion proof actuator assembly and servo system. The explosion proof actuator assembly and servo system can be implemented as a zero-emission actuator configured to limit emissions of methane or other gasses while meeting the requirements of a Class 1 Division 1 rated explosion proof device. Typically, the explosion proof actuator assembly and servo system can be implemented with valves in the oil and gas industry to eliminate methane venting (or bleeding) in natural gas operations to provide zero emissions. Further, the servo system in combination with the explosion proof actuator assembly can provide precision control allowing for accurate control of a valve.

Currently, methane emissions are vented via pneumatic actuators leading to lost gas revenue and greater potential for fines by the Environmental Protection Agency. Any device that vents methane in an enclosed area should meet classification requirements for a Class 1 Division 1 explosion proof device adding to the cost of equipment.

Embodiments of the explosion proof actuator assembly and servo system can meet Class 1 Division 1 requirements, provide zero emissions, and be cost effective. UL standards for Class 1 Division 1 explosion proof requirements are referenced in Appendix A and Appendix B of U.S. Provisional Application No. 62/533,411, filed Jul. 17, 2017, from which priority is currently claimed. Embodiments of the explosion proof actuator assembly and servo system can meet, or qualify for, the requirements as presented in the UL Standards referenced in Appendix A and Appendix B. Embodiments of the explosion proof actuator assembly and servo system can at least meet or qualify for the requirements outlined in UL 674 and UL 1203.

The explosion proof actuator assembly can include, but is not limited to, a housing, an electric motor having a hollow shaft rotor, a threaded member (e.g., a leadscrew), and a nut. The threaded member can be threadably coupled to the nut and can be partially inserted within a cavity of the hollow shaft rotor. In one embodiment, the nut can be threadably coupled to the hollow shaft rotor for easy removal when servicing or changing the threaded member to another threaded member having a different diameter.

The servo system can include, but is not limited to, a control module (or controller), an amplifier, and a sensor (e.g., encoder). Typically, the control module can include one or more processors, random access memory, storage, and a communication means. The communication means can include wired and/or wireless communication protocols and appropriate hardware. The electric motor and the servo system can form a servomechanism to control a location of the threaded member.

Typically, the servo system, the electric motor, and a portion of the threaded member can be located within the explosion proof housing. In some embodiments, the nut can also be located inside of the housing.

Generally, the housing can be configured to couple to a mount for attachment to a valve. The housing can include a threaded cap to allow a user to access the servo system located in the housing. Of note, the threaded cap can be defined as a flame path for the explosion proof actuator assembly. The housing can further include one or more ports for receiving cables, power cords, etc. from components configured to be located outside the housing. For instance, a power cord from an externally located power source can be passed through the port to provide power to the servo system and the electric motor.

In one embodiment, the explosion proof actuator assembly can further include a single piece mount (described hereinafter) adapted to couple to the explosion proof actuator assembly. The single piece mount can include an anti-rotation arm for keeping the leadscrew from rotating. In another embodiment, the explosion proof actuator assembly can be coupled to an existing mounting frame that may be retrofitted with an anti-rotation member.

In a typical implementation, the electric motor can include a rotor shaft, a stator, and a power source. The rotor shaft can include a cavity that can be configured to receive a portion of the threaded member. For instance, the rotor shaft can be a hollow shaft that is adapted to receive the threaded member and couple to the nut. As can be appreciated, the rotor shaft can be implemented to rotate clockwise and counterclockwise. In one embodiment, the power source can be located externally to the assembly. In another embodiment, the power source can be located internally to the assembly.

In one embodiment, the nut can be located proximate a bottom of the rotor shaft and can be configured to threadably receive the threaded member and be threadably coupled to the rotor shaft. Typically, the nut can be coupled to an interior of the rotor shaft such that when the rotor shaft is rotated, the nut can be rotated with the rotor shaft. Other means of operatively connecting the nut to the rotor shaft are contemplated and incorporated as part of this disclosure. Of significant note, the nut can be adapted to rotate with the rotor shaft while the leadscrew is adapted to not rotate. In some embodiments, the nut can be removably coupled to the rotor shaft to allow the nut to be replaced. As previously mentioned, the nut can be threadably coupled to the rotor shaft.

The threaded member can be positioned within the cavity of the rotor shaft and can be threadably engaged to the nut. Of note, when the rotor shaft rotates, the nut can rotate with the rotor shaft which in turn can move the threaded member in a linear motion when the threaded member is restricted from rotating. The direction of movement of the threaded member can be based on which direction the rotor shaft is rotating. As previously mentioned, the threaded member can be connected to a mechanism to keep the threaded member from rotating with the nut as the nut may be rotated. In one instance, the threaded member can be connected to a rod or other member attached to a mount for the explosion proof actuator assembly that keeps the threaded member from rotating. As can be appreciated, the rod can be configured to move up and down with the threaded member while keeping the threaded member from rotating.

In one embodiment, the threaded member may include a portion being a polygon where the polygonal portion is longer than a stroke length of the leadscrew. In such an embodiment, the frame may include a protrusion that extends approximately to a middle of the frame and may include an aperture configured to receive the polygonal portion. The protrusion may be stationary, allow the leadscrew to move laterally through the protrusion, and restrict the leadscrew from rotating. As can be appreciated, other means of keeping the leadscrew from rotating are contemplated and the provided examples are not meant to be limiting.

The servo system can be implemented to control movement of the threaded member by the electric motor. In one embodiment, the control module can be a servomotor. As can be appreciated, other common components of a servomotor may be included. In one embodiment, the control module can include an encoder configured to implement magnets to determine a location of the threaded member. For instance, the rotor shaft may include one or more magnets located proximate an upper end of the shaft that can operatively interact with an encoder configured to determine when the one or magnets come into a predetermined proximity of the encoder. Based on a number of detections of the one or more magnets, the encoder can determine a location of the threaded member, similar to an optical encoder currently available. As can be appreciated, other types of encoders are contemplated. For instance, an optical encoder may be implemented.

In one embodiment, the encoder can be integrated as part of the controller. The encoder can be implemented to provide rotational location feedback of the hollow rotor shaft, which allows for determination of where the threaded member may be at all times. The encoder can allow for a very precise rotational location of the rotor shaft allowing for precise position movements of the threaded member without additional switches. Since the encoder chip may be integrated to the same board as the controller, no wiring, connectors, or external components are required. As can be appreciated, this can reduce the amount of space required and improves robustness of the explosion proof actuator assembly.

In one embodiment, the threaded member can be a single piece of rigid material that does not allow explosive gasses to enter the actuator assembly via the nut attachment location. The threaded member can retract inside the actuator assembly reducing an overall length and size of the actuator assembly. As can be appreciated, since the threaded member does not allow explosive gasses to enter the actuator, the actuator assembly can implement a member with a threaded or otherwise non-smooth surface instead of a requiring a smooth member. Currently, a smooth precision surface of the leadscrew is needed to provide a flame path. Additionally, the nut can be easily replaced with any rotary to linear device that mates to the attachment location. Of note, this improves serviceability and flexibility.

Currently available actuators need at least two or more flame paths in a front end cap. Typically, the two paths are between (i) a housing and a front flange, (ii) a front flange and a rotor, or (iii) a front flange and a shaft. In common implementations, two critically dimensioned surfaces are required because the front flange is a critical component. Because typical actuators require two critical surfaces, the part is very expensive to manufacture in order to hold concentricity and cylindricity within tolerance.

Due to the rotor shaft having a cavity and receiving the threaded member, a front of the actuator only needs a single flame path. For example, the flame path can be located between the rotor shaft and the housing. A single flame path is more cost effective requiring fewer precision parts. Of significant note, the bearing surface and flame path surface can be machined from the same part in the same operation. As can be appreciated, this may reduce machining cost, tolerance stack-up, and the number of surfaces requiring close inspection.

Of particular note, the explosion proof actuator assembly can implement a rotating nut instead of the conventional rotating screw designs. By implementing the rotating nut, the explosion proof actuator assembly can be mounted to practically any valve stem without having to integrate the nut into the valve. As can be appreciated, the explosion proof actuator assembly can be interchanged with any screw technology by simply threading a new nut into the end of the hollow rotor shaft. For instance, if a smaller or larger interior diameter of the nut is needed, a properly sized nut may be coupled to the hollow rotor shaft allowing the explosion proof actuator assembly to be sized to pre-existing mounts.

One embodiment of the explosion proof actuator assembly can include a linear actuator with an integrated servo controller, amplifier, motor, and encoder in an explosion proof housing having a Class 1 Division 1 rating. The actuator assembly can implement a blind rotor shaft to reduce overall length and complexity. The actuator assembly can implement a single flame path in a front side of the motor. The actuator assembly can implement a rotating nut to drive a non-rotating threaded rod. The actuator assembly can implement an optical encoder feedback mounted directly to the control/drive board. In one embodiment, the actuator assembly can implement encoder magnets installed integral to the rotor shaft. The actuator assembly can implement an integral nut/shaft design with the nut rotating to translate rotary to linear motion. The rotor assembly can be a Class 1, Division 1 rated servo actuator.

Embodiments are contemplated where the threaded member threadably couples to an interior of the hollow shaft rotor directly. In such an embodiment, the nut can be removed from the assembly and the threaded member can interface directly with the hollow shaft rotor. As can be appreciated, as the hollow shaft rotates, the threaded member can be moved in either direction depending on a direction of rotation of the hollow shaft rotor.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

An Embodiment of an Explosion Proof Actuator Assembly

Referring to FIGS. 1-6, detailed diagrams of an embodiment 100 of an explosion proof actuator assembly are illustrated. The explosion proof actuator assembly 100 can be implemented in place of currently used pneumatic controllers to reduce and/or eliminate venting of natural gas. Of significant note, the explosion proof actuator assembly 100 can be rated Class 1 Division 1 explosion proof.

Referring to FIG. 1, a front view of the explosion proof actuator assembly 100 is illustrated including a cross-sectional line A-A. In a typical implementation, the assembly 100 can be coupled to a mount for attachment to a valve on a pipeline in an oil and gas field. In some instances, the assembly 100 can be configured to receive data from a remotely located device to determine how far to open or close the valve.

As shown, the explosion proof actuator assembly 100 can include, but is not limited to, a housing 102, a hollow shaft rotor 104, a stator 106 (shown in FIG. 2), a threaded rod 108, and a nut 110. The nut 110 can be configured to rotate with the hollow shaft rotor 104. The housing 102 can be configured to couple to a mount for attachment to a valve. In some embodiments, the explosion proof actuator assembly 100 can further include a servo system 120.

The housing 102 can include, but is not limited to, a removable cap 112, a mounting plate 114, and one or more ports 116. The removable cap 112 can typically be threadably coupled to the housing 102 and can provide access to electronics of the assembly 100. The mounting plate 114 can be implemented to couple the assembly 100 to a mount. The one or more ports 116 can be implemented to provide access to an interior of the housing 102 for cables coming from components located outside of the assembly 100. For example, a power supply cable coming from a power supply located remotely from the assembly 100 can be passed through one of the ports 116 to the electronics. As shown, the housing 102 can have a substantially cylindrical shape. Of note, other shapes for the housing 102 are contemplated and would not exceed a scope of the present disclosure. As will be shown in the cross-sectional view, the housing 102 can include a bore in which components of the assembly 100 may be located. In one embodiment, the housing 102 can have a substantially tubular shape with a circular cross-section.

Typically, the housing 102 can be manufactured from a rigid material. In some instances, the housing 102 may be machined from a single stock of material. In other instances, the housing 102 may be cast. It is to be appreciated that several different means for forming the housing 102 are contemplated. In one example, the housing 102 can be manufactured via a casting process with aluminum.

Figure 2:
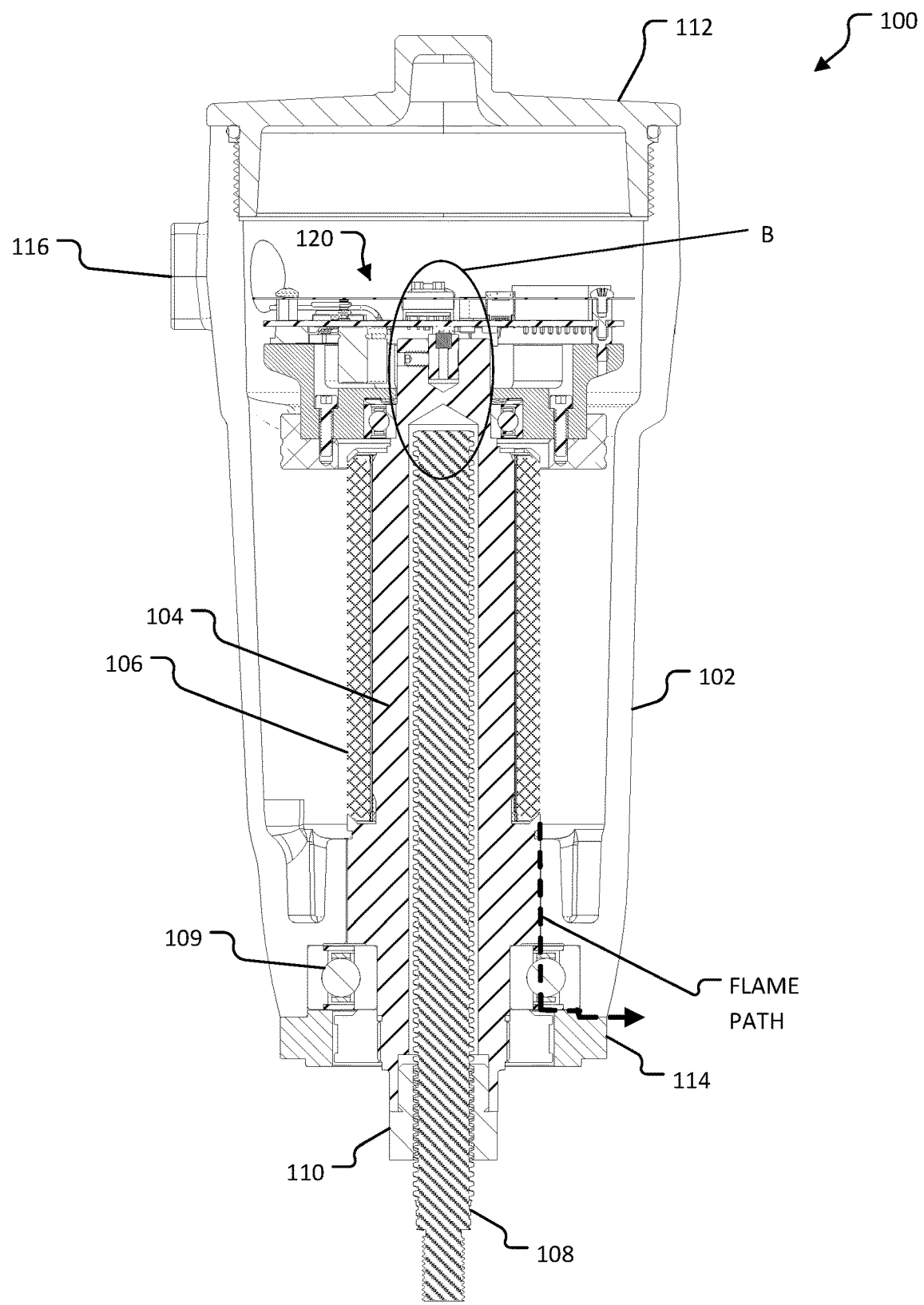
FIG. 2 is a cross-sectional view of an explosion proof actuator assembly along a line A-A of FIG. 1 according to one embodiment of the present invention.

Referring to FIG. 2, a cross-sectional view along line A-A of the assembly 100 is illustrated. The hollow shaft rotor 104, the stator 106, and a bearing assembly 109 can form an electric motor configured to rotate the hollow shaft rotor 104. A power source (not shown) can be included to power the electric motor. In one instance, an external source of power can be implemented. In another instance, a battery may be included that may be recharged by green energy methods. For example, solar panels may be included to charge the battery power source.

The hollow shaft rotor 104 can include an open first end and a cavity extending from the open first end to a closed second end. The open first end of the hollow shaft rotor 104 can be located proximate a bottom of the housing 102 and can receive the threaded member 108. As shown, the threaded member 108 can be inserted into and within the cavity of the hollow shaft rotor 104. In one example, the hollow shaft rotor 104 can be machined from a single stock of material. For instance, a rod of material can be machined to form the hollow shaft rotor 104. By machining a single stock of solid material, the second end can remain closed to prevent a flame path being formed. As can be appreciated, embodiments of the hollow shaft rotor 104 are contemplated where the second end includes a threaded cap or a cap welded to an end of a tubular pipe.

The bearing assembly 109 can be implemented to provide an interface between the hollow shaft rotor 104 and an interior of the housing 102. As shown, the hollow shaft rotor 104 can rest on the bearing assembly 109 and allow the hollow shaft rotor 104 to rotate. Of note, the bearing assembly 109 can provide a flame path for any explosions happening in an interior of the housing where the motor 104, 106 is located. An example "Flame Path" is shown in FIG. 2. As shown, the flame path would allow any flames to cool as they move from an interior of the housing 102, between the hollow shaft rotor 104 and the housing 102, and then exit out the housing 102 via the bearing assembly 109 to be vented to atmosphere.

The nut 110 can be coupled to the hollow shaft rotor 104 and can rotate with the hollow shaft rotor 104 when the electric motor rotates the hollow shaft rotor 104. In one embodiment, the nut 110 can be removably coupled to the hollow shaft rotor 104. For instance, the nut 110 can be threadably coupled to the hollow shaft rotor 104. In one example, the hollow shaft rotor 104 may be internally threaded proximate a bottom of the shaft to threadably couple to an externally threaded portion of the nut 110. Of significant note, the nut 110 can be removed from the hollow shaft rotor 104 without affecting the flame path of the assembly 100. As can be appreciated, while the assembly 100 is being serviced, the assembly 100 can keep the integrity of a Class 1 Division 1 rated explosion proof device.

In another embodiment, the nut 110 can be more permanently coupled to the hollow shaft rotor 104. For instance, the nut 110 may be welded to the hollow shaft rotor 104. As can be appreciated, other means of removably coupling the nut to the hollow shaft rotor 104 are contemplated and incorporated as part of this disclosure.

Typically, the threaded rod 108 can be threadably coupled to an interior of the nut 110. By providing a removably coupled nut 110 to the hollow shaft rotor 104, a variety of differently sized threaded rods can be used with the assembly 100. For instance, a first nut having a first interior diameter matching a first rod can be removed and a second nut having a second interior diameter matching a second rod can be coupled to the hollow shaft rotor 104. As an example, the assembly 100 may be removed from a first location where the first rod was needed and moved to a second location where the second rod is needed. As can be appreciated, the assembly 100 can be easily adjusted for use with a variety of different valves.

Of note, the threaded rod 108 can be fixed rotationally via another component such that the threaded rod 108 does not rotate with the nut 110. As shown, the hollow shaft rotor 104 can be configured to receive a portion of the threaded rod 108. Further, the threaded rod 108 can be adapted to move linearly within the hollow shaft rotor 104.

In some embodiments, the explosion proof actuator assembly 100 can further include the servo system 120. As shown, the servo system 120 can be located in an upper portion of the housing 102 and may be accessed via the removable cap 112. The servo system 120 may be operatively coupled to externally located components via the ports 116. As will be described in more detail hereinafter, the servo system 120 can be located proximate a top of the hollow shaft rotor 104.

Figure 3:
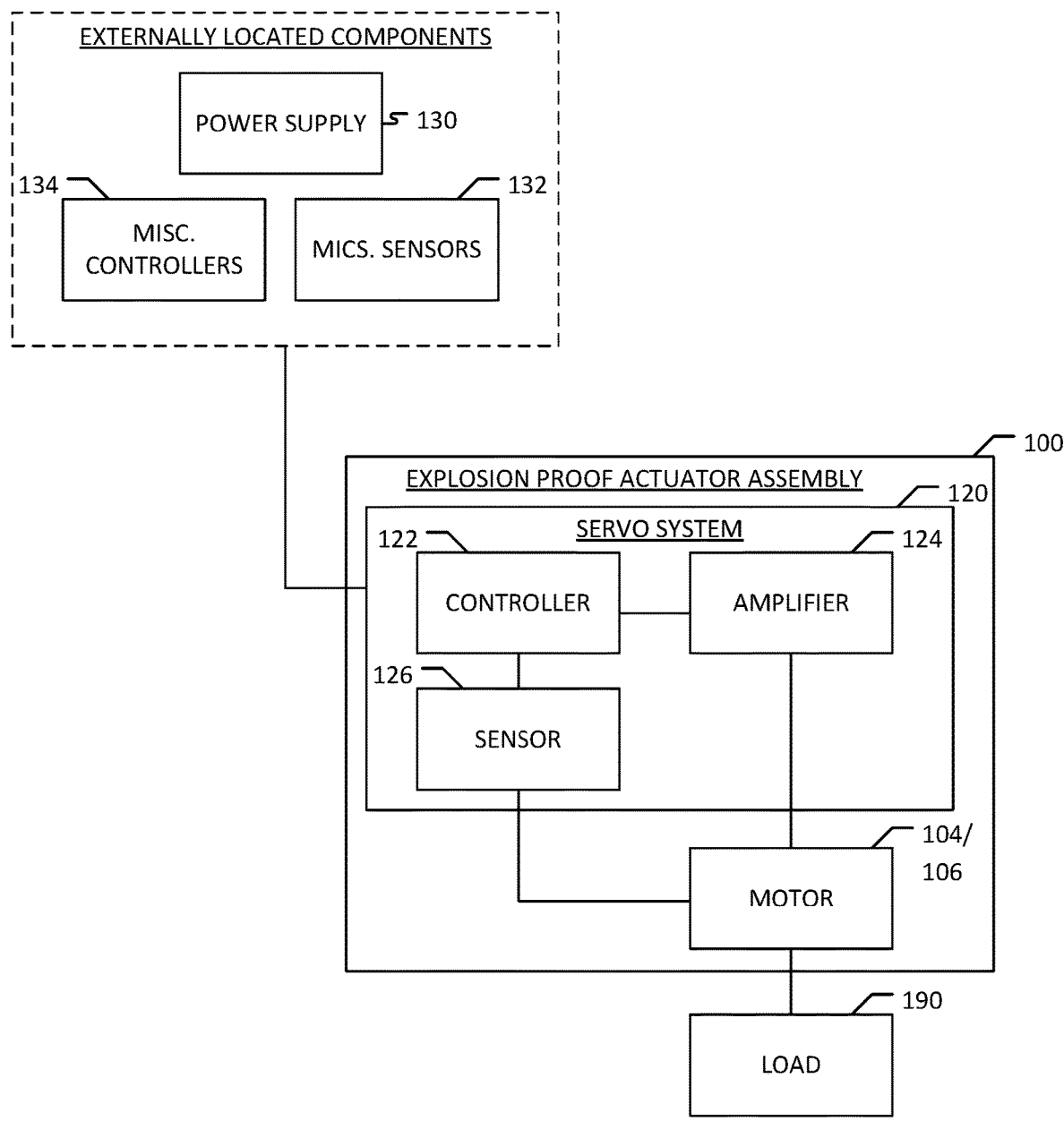
FIG. 3 is a block diagram of an explosion proof actuator assembly and a servo system according to one embodiment of the present invention.

Referring to FIG. 3, a block diagram of the servo system 120 is illustrated. As shown, the servo system 120 can include, but is not limited to, a controller 122, an amplifier 124, a sensor 126, and a load 190. The servo system 120 can be implemented to control a movement and location of the threaded member 108 by actuating the electric motor 104, 106. In one embodiment, the servo system 120 can be implemented to automate a movement of the threaded rod 108. Generally, the servo system 120 can be powered by an externally located power source 130. For instance, a battery located exterior to the assembly 100 may be implemented to power the assembly 100. In some instances, the battery 130 may be recharged via solar energy or wind energy. In one embodiment, the servo system 120 can be powered via a generator.

In a typical implementation, the controller 122 can be configured to receive input from an externally located component to determine when to move the threaded member 108. The externally located components may include one or more sensors 132 and/or one or more controllers 134. For instance, the one or more sensors 132 may be a pressure sensor located downstream of a valve the explosion proof actuator assembly 100 is coupled to. The servo system 120 may be configured to open or close the valve based on data received from the sensor located externally to the assembly 100. In some embodiments, the servo system 120 may be operatively connected to a central control system configured to control a plurality of different components in an oil and gas field operation. For instance, the control system may determine when each valve in a system of valves need to be opened and closed. The control system may send a signal(s) to the servo system 120 to open and close a valve the assembly 100 is coupled to.

The controller 122 can typically include a processor, random access memory, nonvolatile storage, and a network interface. The processor can be a single microprocessor, multi-core processor, or a group of processors. The random access memory can store executable code as well as data that can be immediately accessible to the processor. The nonvolatile storage can store executable code and data in a persistent state. The network interface can include, but is not limited to, hardwired and wireless interfaces through which the server can communicate with other devices. The controller 122 can be programmable to allow for variations in sizes of the threaded member 108 and threaded members having different thread counts. As can be appreciated, the thread count and spacing of the threads on a screw can determine how far the screw moves when rotated.

The amplifier 124 can be implemented to receive a signal from the controller 122, amplify the signal, and transmit an electric current to the electric motor 104, 106 in order to produce motion proportional to the signal. The sensor 126 can then determine a number of rotations completed by the hollow shaft rotor 104 and let the controller 122 know so that the controller 122 may stop the motor 104, 106 when a predetermined number of rotations of the hollow shaft rotor 104 have been completed. As can be appreciated, a number of rotations of the hollow shaft rotor 104 can be translated to a distance traveled by the threaded member 108.

In one embodiment, the sensor 126 can be a feedback sensor configured to determine a rotational location of the hollow shaft rotor 104. For instance, in embodiments where the hollow shaft rotor 104 includes a magnet located proximate a top of the second end of the rotor 104, the sensor 126 can be configured to detect a magnetic field of the magnet and determine a rotational location based on a strength of the magnetic field detected by the sensor 126. The sensor 126 may then send data to the controller 122 including a rotation count to help the controller 122 know when to stop the hollow shaft rotor 104 from rotating.

As shown in FIG. 2, the servo system 120 can be located in an upper portion of the explosion proof actuator assembly 100 and can be accessible via the removable lid 112.

The load 190 may be any device, component, or piece of machinery that can be actuated via a linear force. For example, the load 190 may be a valve that can be opened and closed via a linear force being applied to the valve. Although valves, and more specifically valves used in the oil and gas industry, are disclosed, the present explosion proof actuator assembly 100 may be implemented in other applications and mechanisms where linear actuators are presently used.

Figure 4:
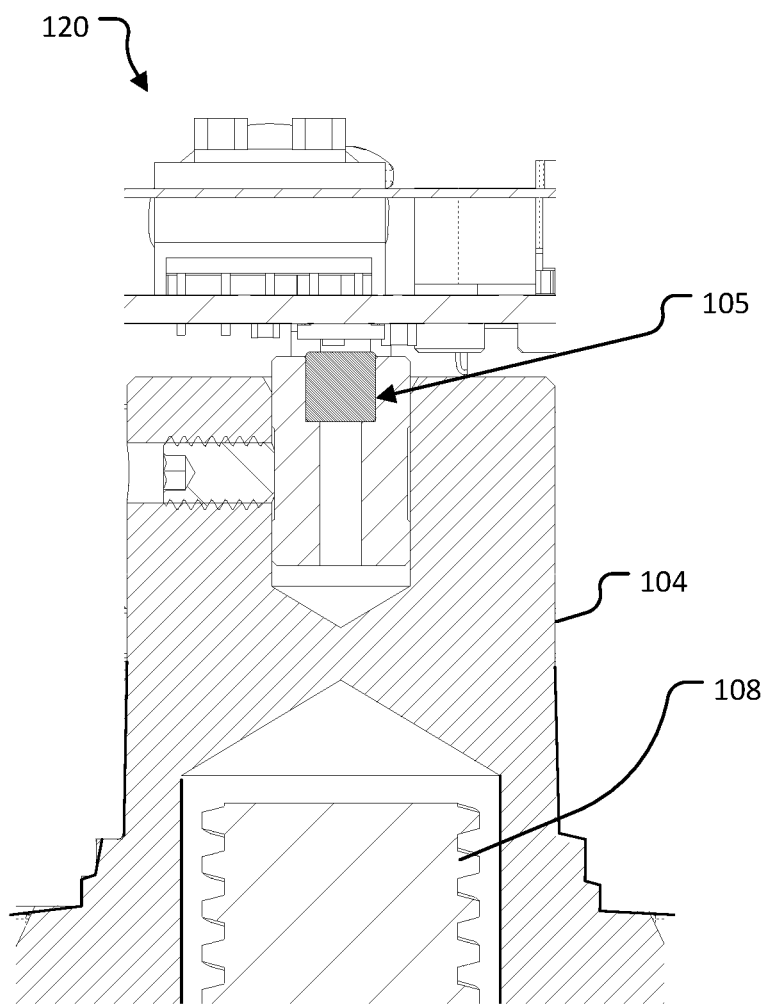
FIG. 4 is a close-up cross-sectional view of an explosion proof actuator assembly according to one embodiment of the present invention

Referring to FIG. 4, a close-up view of a top portion 'B' highlighted in FIG. 2 of the assembly 100 is illustrated. In one embodiment, the hollow shaft rotor 104 can include a magnet 105 located proximate a top of the hollow shaft rotor 104. The magnet 105 can be placed to be proximate to the sensor 126 of the servo system 120. As can be appreciated, the magnet 105 and the sensor 126 can be implemented to provide feedback to the controller 122. For instance, they can provide a number of rotations completed by the hollow shaft rotor 104. The controller 122 can then determine an amount of distance to move the threaded member 108 by converting a number of rotations of the hollow shaft rotor 104, in addition to a thread count of the threaded member 108, into a linear distance. When the servo system 120 receives a signal to open or close a valve, the controller 122 can initiate the electric motor and then stop the motor after determining the hollow shaft rotor 104 has completed a predetermined number of rotations.

In one embodiment, as shown, the magnet 105 can be removably placed into a cavity located proximate a top of the hollow shaft rotor 104. As can be appreciated, by providing a cavity in the top of the hollow shaft rotor 104, a precise distance between the magnet 105 and the sensor 126 can be achieved. For instance, the magnet 105 may be moved up and down within the cavity to achieve a preferred distance between the two components. In one example, a location of the magnet 105 may be adjusted via a screw.

Figure 5:
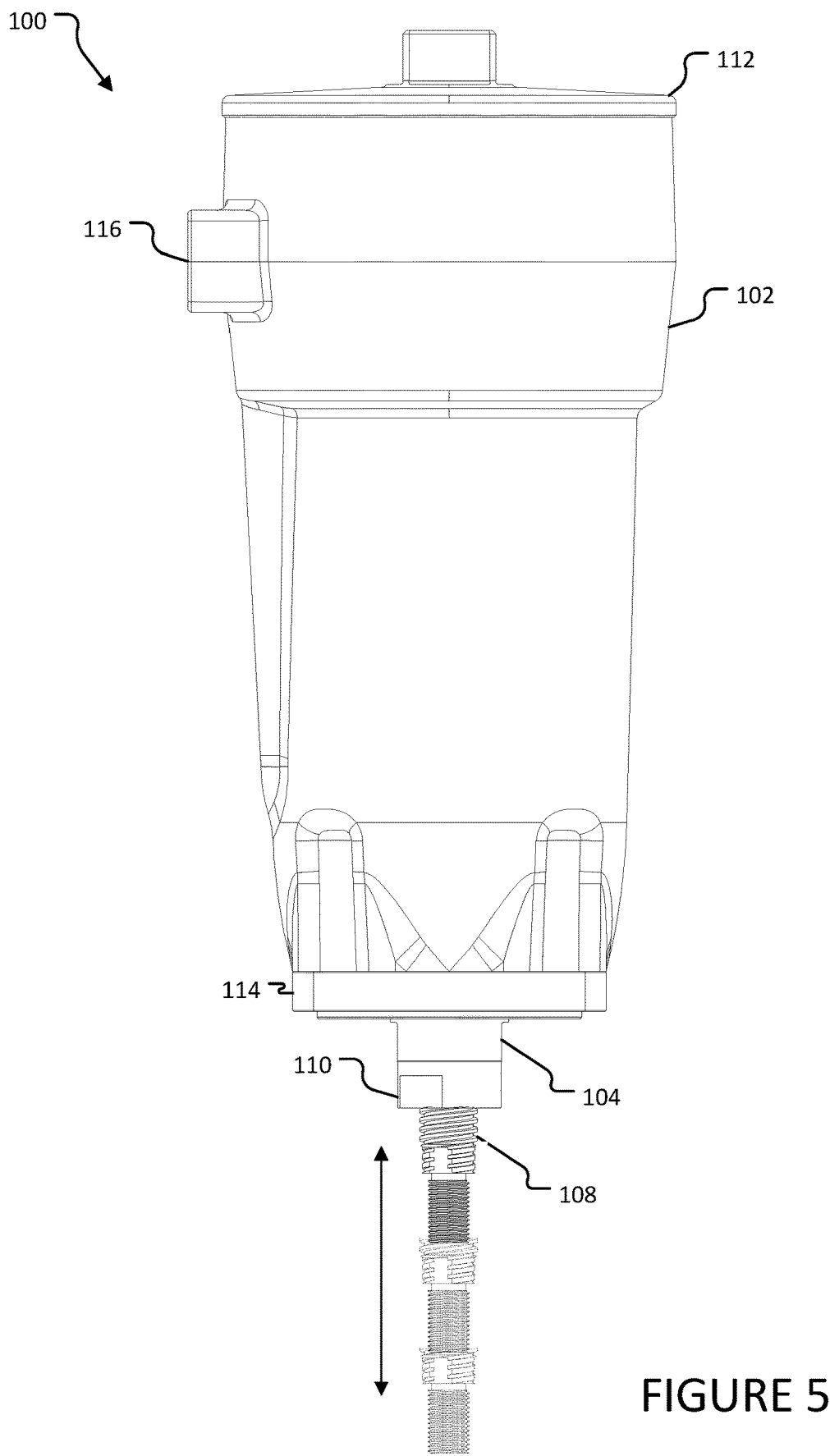
FIG. 5 is a side view of an explosion proof actuator assembly according to one embodiment of the present invention.

Referring to FIG. 5, a side view of the assembly 100 is illustrated. As shown, the threaded member 108 can move linearly within and out of the hollow shaft rotor 104 of the assembly 100. A stroke direction of the threaded member 108 is shown. As can be appreciated, the threaded member 108 may be moved linearly along a longitudinal axis of the hollow shaft rotor 104. As previously mentioned, the threaded member 108 can be coupled to an anti-rotation device to prevent the threaded member 108 from rotating with the hollow shaft rotor 104 and the nut 110.

Figure 6:
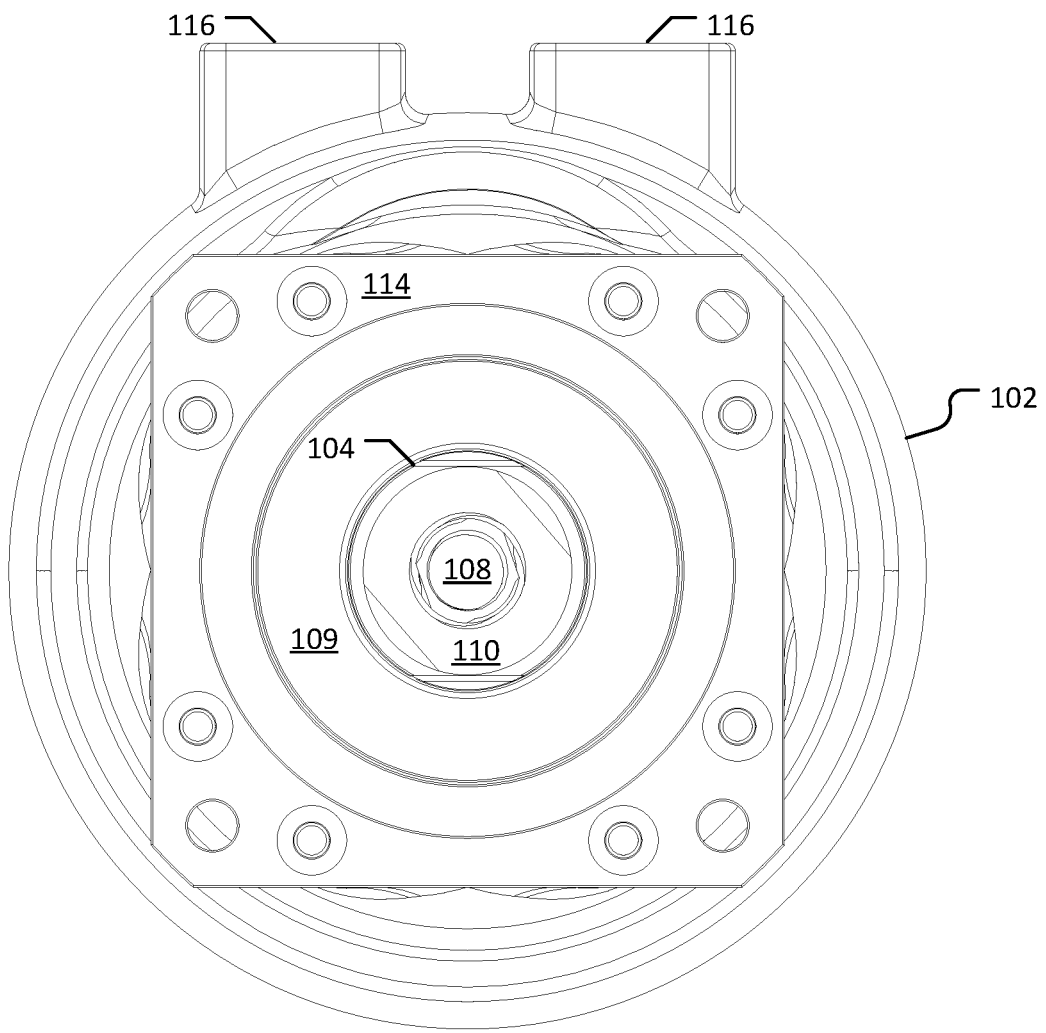
FIG. 6 is a bottom view of an explosion proof actuator assembly according to one embodiment of the present invention.

Referring to FIG. 6, a bottom view of the assembly 100 is illustrated. Of note, in some embodiments the nut 110 can include a pair of opposing flat faces to allow a tool to easily grip the nut 110 for removal from the hollow shaft rotor 104.

The mounting plate 114 can include a plurality of apertures for receiving fasteners to couple to a mount.

Figure 7:
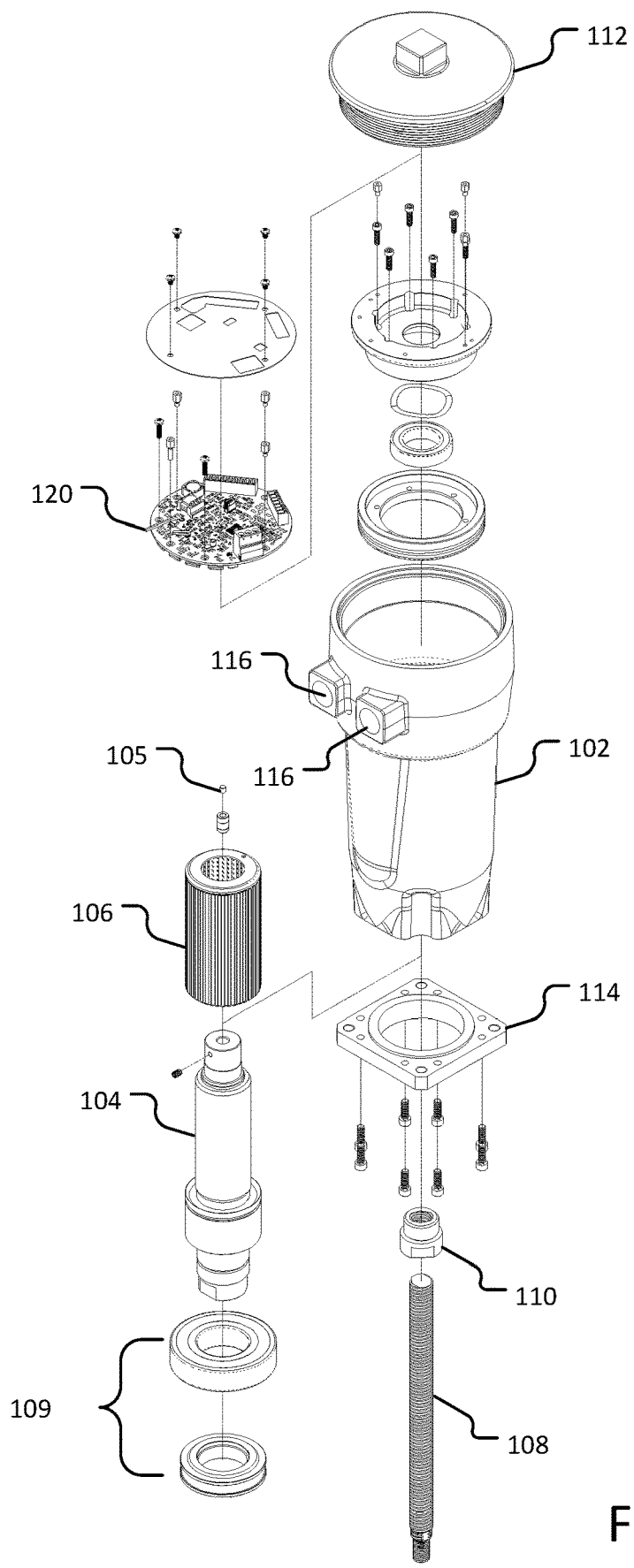
FIG. 7 is an exploded view of an explosion proof actuator assembly according to one embodiment of the present invention.

Referring to FIG. 7, an exploded view of the assembly 100 is illustrated. As shown, the stator 106 can be configured to slide over the hollow shaft rotor 104, with the threaded member 108 being sized to fit within the cavity of the hollow shaft rotor 104. The mounting plate 114 is shown as being coupled to the housing 102 via a plurality of fasteners. In some embodiments, the mounting late 114 may be integrally formed with the housing 102. In other embodiments, as discussed later, the mounting plate 114 may be integrally formed with a mount such that the housing 102 can be directly coupled to the mount. The threaded cap 112 and the ports 116 can provide flame paths for any explosions that may happen due to the servo system 120.

Figure 8:
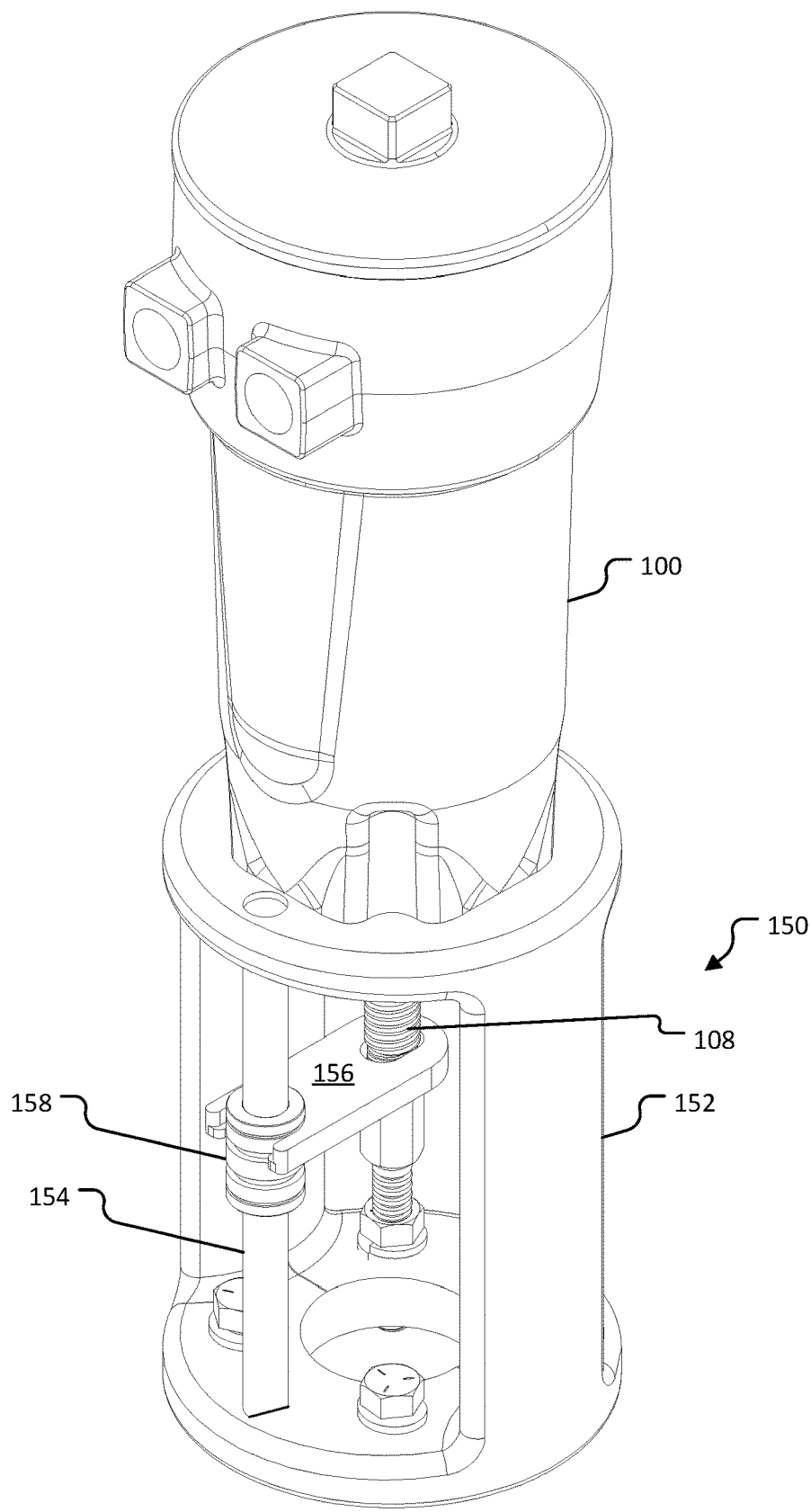
FIG. 8 is a perspective view of an explosion proof actuator assembly coupled to a mount according to one embodiment of the present invention.
Figure 9:
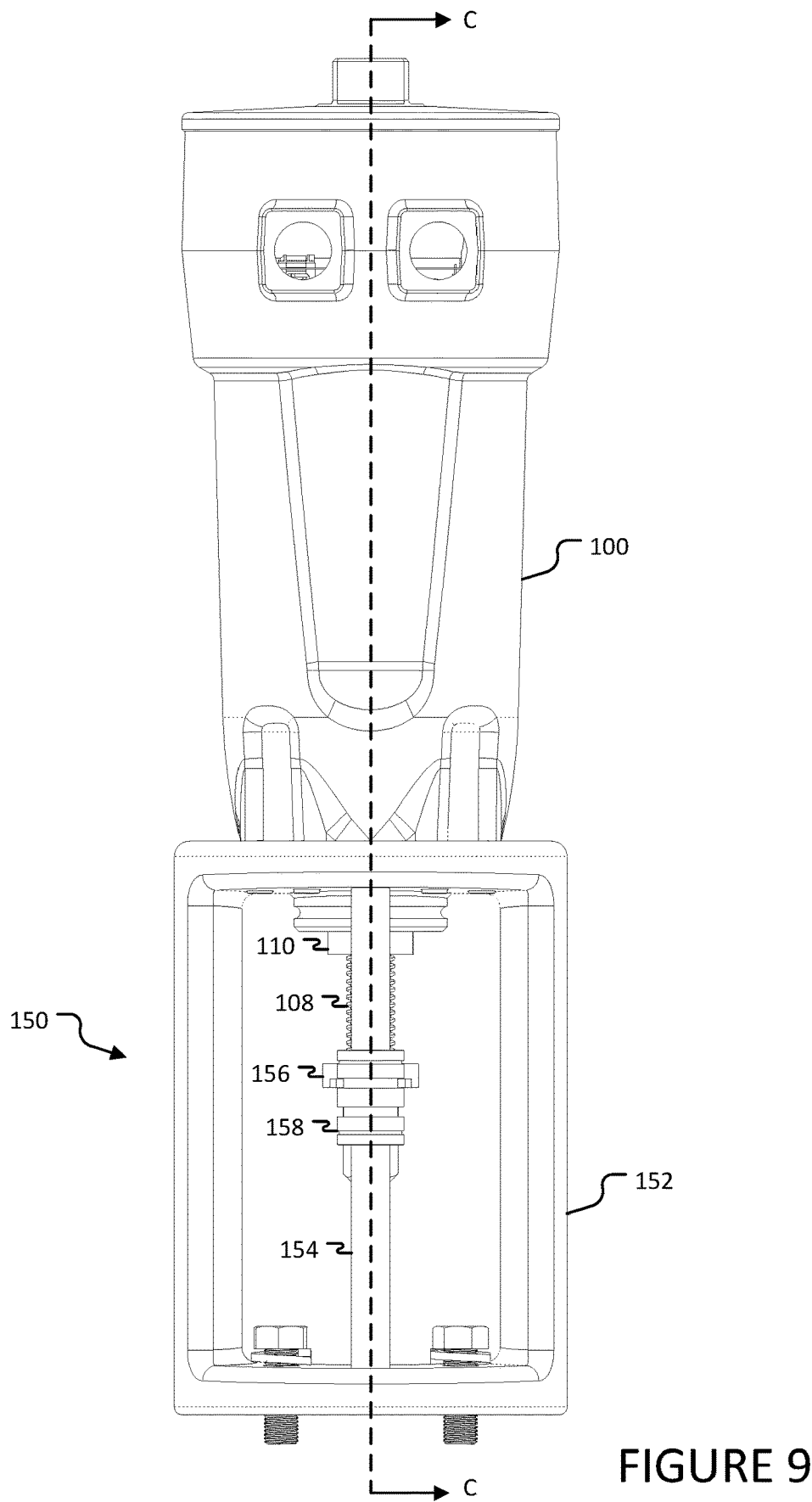
FIG. 9 is a front view of an explosion proof actuator assembly coupled to a mount according to one embodiment of the present invention.
Figure 10:
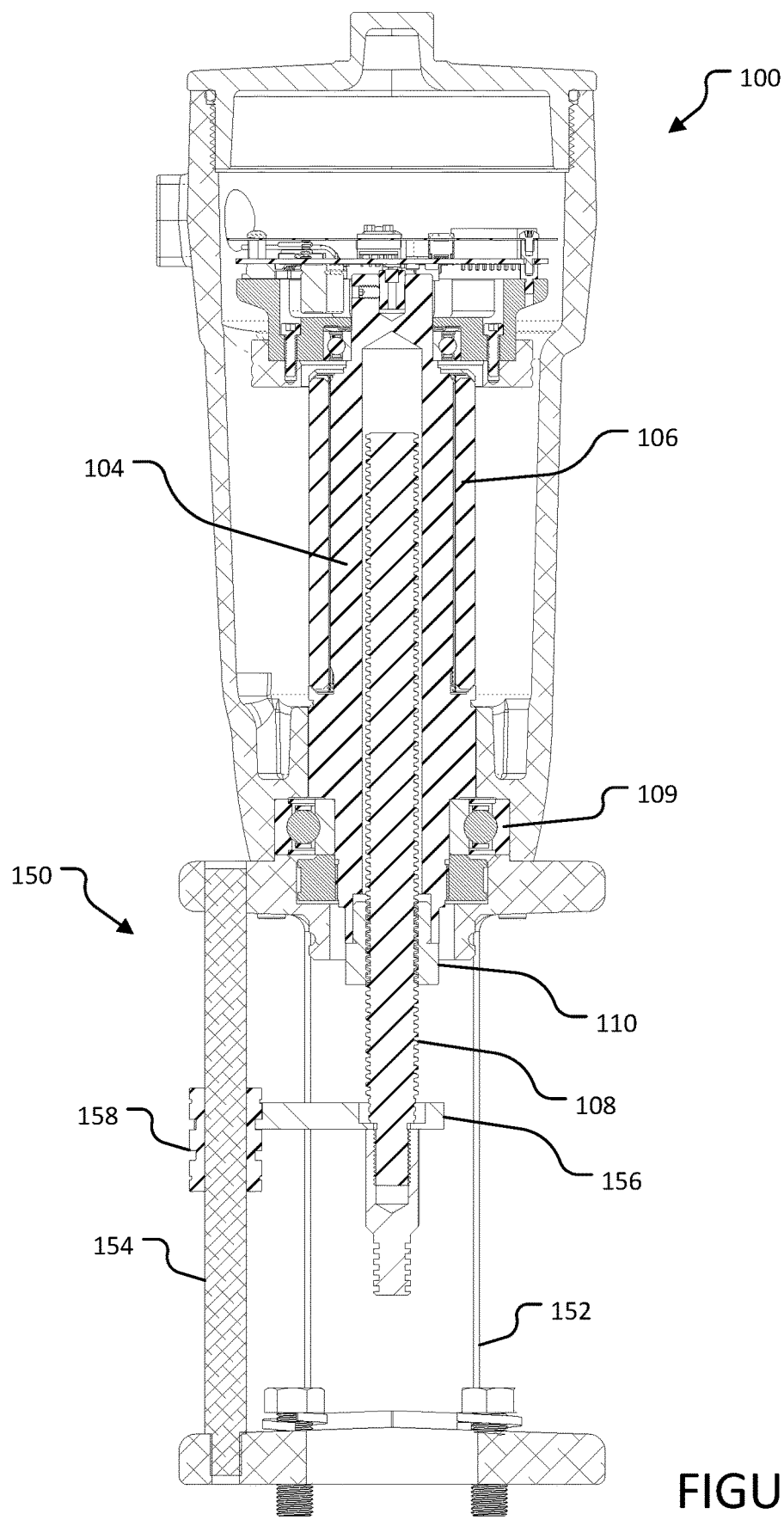
FIG. 10 is cross-sectional view of an explosion proof actuator assembly coupled to a mount along a line C-C of FIG. 9 according to one embodiment of the present invention.

Referring to FIGS. 8-10, detailed diagrams of the explosion proof actuator assembly 100 coupled to a mount 150, are illustrated. In one embodiment, the mount 150 can be a single piece mount implemented to couple the explosion proof actuator assembly 100 to a valve 190 (shown in FIG. 11) in an oil and gas application. Depending on an implementation, the mounting plate 114 may be coupled to the housing 102 as generally shown, or a component similar to the mounting plate 114 may be integrated into a top of the mount 150 for the housing 102 to directly couple to.

Embodiments of the explosion proof actuator assembly 100 and the mount 150 are contemplated where the assembly 100 is configured to couple directly to the mount 150. For instance, the assembly and mount 150 could be included in a kit and sold together. In other embodiments, the assembly 100 may include a universal mounting plate 114 such that the assembly 100 can be configured to couple to a variety of different mounts and not be limited to a single mount type. In such embodiments, the assembly may be sold with a universal mounting plate.

In one embodiment, the single piece mount 150 can include, but is not limited to, a frame 152, a rod 154, an arm 156, and a bearing assembly 158. In one instance, the frame 152 can be die cast with a rigid material. In another instance, the frame 152 may be forged into shape. In yet another embodiment, the frame 152 may be formed from a single piece of rigid material.

As generally shown, the rod 154 can be configured to extend between a top and bottom of the single piece frame 152 and be coupled thereto. In some instances, the rod 154 can be removably coupled to allow for replacement when necessary. The bearing assembly 158 can be configured to interface with the rod 154 while sliding up and down about the rod 154. In one instance, the bearing assembly 158 can be a self-lubricating bearing assembly. The arm 156 can be implemented as an anti-rotation device to prevent the threaded member 108 from rotating. The anti-rotation arm 156 can be coupled to the bearing assembly 158 such that the anti-rotation arm 156 does not rotate about the rod 154. As can be appreciated, the anti-rotation arm 156 can be implemented to prevent the threaded member 108 from rotating, thus allowing the threaded member 108 to move up or down as the nut 110 is rotated. As can be appreciated, the bearing assembly 158 can be configured to slide along the rod 154 as the threaded member 108 is moved up or down.

Figure 11:
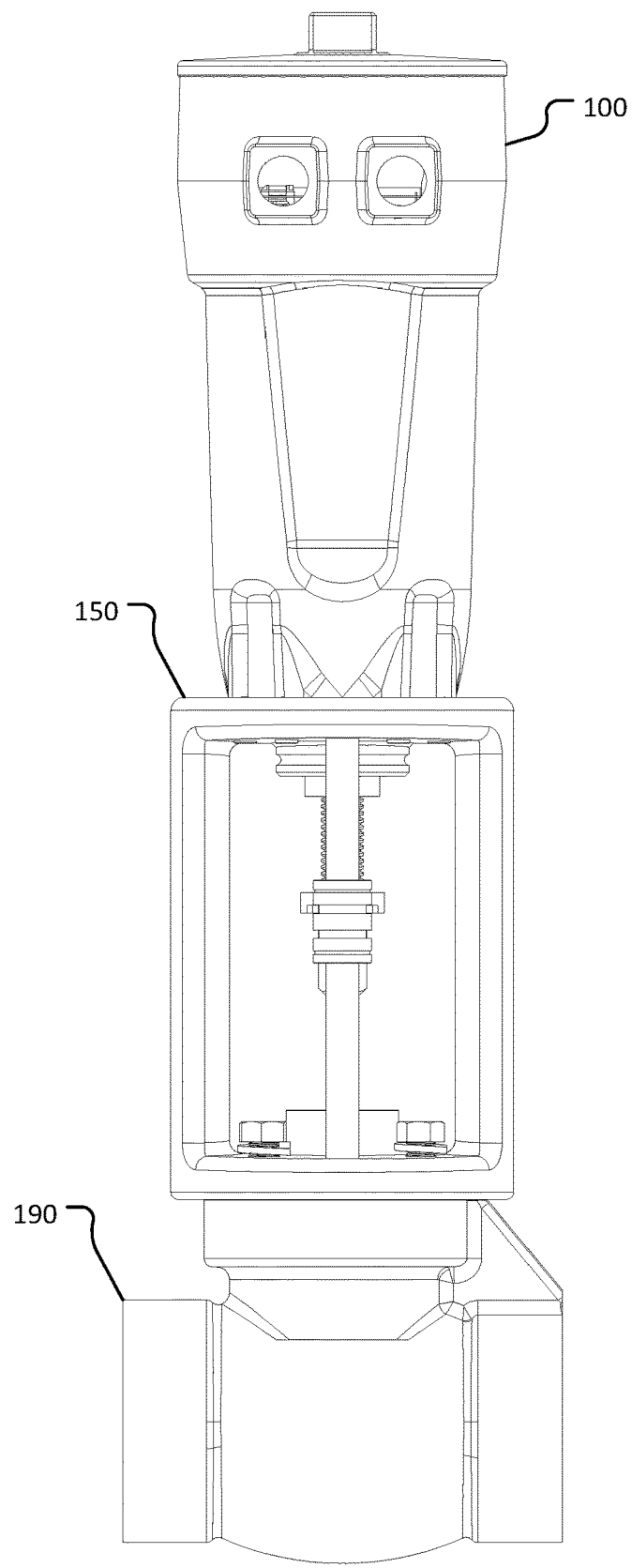
FIG. 11 is a front view of an explosion proof actuator assembly coupled to a mount and a valve according to one embodiment of the present invention.

Referring to FIG. 11, a front view of the explosion proof actuator assembly 100 and the mount 150 coupled to a valve 190 is illustrated. The explosion proof actuator assembly 100 can be configured to open and close the valve 190 based on receiving input from an externally located source. As can be appreciated, the valve 190 may be included in a pipe system in an oil and gas field operation.

By providing the single piece mount 150, the explosion proof actuator assembly 100 can be implemented in the field with no additional hardware to attach to a pre-existing valve. As can be appreciated, this can save costs, part count, and complexity. In one embodiment, the bearing 158 may be a self-lubricating bearing that can require no grease and can work in dusty, wet, and/or outdoor environments. Further lowering costs and complexity; the single piece mount 150 can be manufactured as a single piece configured to be located between a valve and the explosion proof actuator assembly 100.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. An explosion proof actuator assembly comprising:
   a substantially tubular housing;
   an electric motor including a hollow shaft rotor and a stator, the hollow shaft rotor having an open first end and a closed second end;
   a nut coupled to the first end of the hollow shaft rotor and including interior threads;
   a threaded member coupled to the nut, the threaded member (i) being partially inserted into the hollow shaft rotor, (ii) having exterior threads threadably coupling with the interior threads of the nut, and (iii) adapted to move within the hollow shaft rotor; and
   an anti-rotation device adapted to keep the threaded member from rotating;
   wherein the threaded member is adapted to be kept from rotating and move linearly within the hollow shaft rotor.

2. The explosion proof actuator assembly of claim 1, wherein a second opening of the housing is threaded and adapted to receive a cap.

3. The explosion proof actuator assembly of claim 1, wherein the open first end of the hollow shaft rotor is located outside of the housing.

4. The explosion proof actuator assembly of claim 1, wherein the nut is threadably coupled to the threaded member and adapted to rotate about the threaded member.

5. The explosion proof actuator assembly of claim 1, the assembly further including a servo system, the servo system being adapted to control movement of the threaded member.

6. The explosion proof actuator assembly of claim 5, wherein the hollow shaft rotor includes a permanent magnet located proximate a top of the threaded member.

7. The explosion proof actuator assembly of claim 6, wherein the servo system includes an encoder adapted to determine a rotational count based on the permanent magnet.

8. The explosion proof actuator assembly of claim 1, wherein the assembly is a Class 1 Division 1 explosion proof device.

9. The explosion proof actuator assembly of claim 1, wherein the assembly further includes a bearing assembly.

10. The explosion proof actuator assembly of claim 9, wherein the bearing assembly provides a flame path for the explosion proof actuator assembly.

11. An explosion proof actuator assembly comprising:
- an explosion proof housing;
- an electric motor located substantially within the housing, the electric motor including a stator and a hollow shaft rotor;
- a nut coupled to the hollow shaft rotor, the nut being located outside of the housing and including interior threads;
- a threaded member having exterior threads threadably coupled to the interior threads of the nut and being partially inserted into the hollow shaft rotor; and
- an anti-rotation device adapted to keep the threaded member from rotating;
- wherein the threaded member is adapted to move linearly within the hollow shaft rotor.

12. The explosion proof actuator assembly of claim 11, wherein the hollow shaft rotor includes a first end and a second end, the first end being open and the second end being closed.

13. The explosion proof actuator assembly of claim 12, wherein the hollow shaft rotor includes a magnet located proximate the second end of the hollow shaft rotor.

14. The explosion proof actuator assembly of claim 13, wherein the explosion proof actuator assembly further includes a sensor adapted to detect a magnetic field of the magnet.

15. The explosion proof actuator assembly of claim 11, wherein the nut is removably coupled to the hollow shaft rotor.

16. The explosion proof actuator assembly of claim 11, wherein the threaded member is coupled to the anti-rotation device.

17. The explosion proof actuator assembly of claim 16, wherein the threaded member is adapted to move linearly when the nut is rotated.

18. The explosion proof actuator assembly of claim 11, the assembly further including an externally located power source.

19. The explosion proof actuator assembly of claim 11, the assembly further including a bearing assembly, the hollow shaft rotor resting on the bearing assembly;
- wherein the bearing assembly provides the only flame path for the explosion proof actuator assembly.

20. An explosion proof actuator assembly meeting Class 1 Division 1 requirements for an explosion proof device, the assembly comprising:
- a substantially tubular housing;
- an electric motor including a hollow shaft rotor and a stator, the hollow shaft rotor having an open first end and a closed second end;
- a nut directly coupled to the first end of the hollow shaft rotor, wherein the nut can be removed from the hollow shaft rotor while the assembly maintains integrity of a Class 1 Division 1 rated explosion proof device;
- a threaded member coupled to the nut, the threaded member being partially inserted into the hollow shaft rotor and adapted to move within the hollow shaft rotor; and
- an anti-rotation device adapted to keep the threaded member from rotating.

\* \* \* \* \*